US009563966B2

United States Patent
Kalevo et al.

(10) Patent No.: US 9,563,966 B2
(45) Date of Patent: Feb. 7, 2017

(54) IMAGE CONTROL METHOD FOR DEFINING IMAGES FOR WAYPOINTS ALONG A TRAJECTORY

(75) Inventors: Ossi Mikael Kalevo, Toijala (FI); Markku Oikkonen, Helsinki (FI); Euan James Barron, Tampere (FI)

(73) Assignee: Nokia Technologies Oy, Espoo (FI)

( * ) Notice: Subject to any disclaimer, the term of this patent is extended or adjusted under 35 U.S.C. 154(b) by 170 days.

(21) Appl. No.: 14/368,010

(22) PCT Filed: Dec. 23, 2011

(86) PCT No.: PCT/IB2011/055942
§ 371 (c)(1),
(2), (4) Date: Jun. 23, 2014

(87) PCT Pub. No.: WO2013/093572
PCT Pub. Date: Jun. 27, 2013

(65) Prior Publication Data
US 2014/0369563 A1  Dec. 18, 2014

(51) Int. Cl.
*G06T 7/20* (2006.01)
*H04N 5/232* (2006.01)
*G06K 9/64* (2006.01)

(52) U.S. Cl.
CPC .............. *G06T 7/204* (2013.01); *G06K 9/64* (2013.01); *H04N 5/232* (2013.01); *H04N 5/23293* (2013.01)

(58) Field of Classification Search
None
See application file for complete search history.

(56) References Cited

U.S. PATENT DOCUMENTS

| 5,353,391 A | * | 10/1994 | Cohen | G11B 27/034 345/619 |
| 7,168,953 B1 | | 1/2007 | Poggio et al. | 434/185 |
| 2008/0256449 A1 | * | 10/2008 | Bhatt | G11B 27/10 715/720 |
| 2009/0244317 A1 | * | 10/2009 | Makii | H04N 5/23245 348/229.1 |
| 2010/0246957 A1 | * | 9/2010 | Visser | G06T 19/003 382/173 |

(Continued)

FOREIGN PATENT DOCUMENTS

| EP | 1995961 A1 | 11/2008 |
| WO | WO2011026527 A1 | 3/2011 |

(Continued)

OTHER PUBLICATIONS

"Panorama"; <http://en.wikipedia.org/wiki/Panorama>; Accessed Sep. 12, 2011; 4 pgs.

(Continued)

*Primary Examiner* — Tahmina Ansari
(74) *Attorney, Agent, or Firm* — Harrington & Smith (57) ABSTRACT

A method including: displaying on a display a reference image; displaying on the display a start position within the reference image; displaying on the display an end position within the reference image; determining a trajectory between the start position and the end position; and defining a target image for each of a plurality of waypoints along the determined trajectory.

20 Claims, 4 Drawing Sheets

(56) References Cited

U.S. PATENT DOCUMENTS

2014/0369563 A1* 12/2014 Kalevo ............... H04N 5/232
                                                                             382/103

FOREIGN PATENT DOCUMENTS

| WO | WO2011101843 A1 | 8/2011 |
| WO | WO2011146259 A2 | 11/2011 |

OTHER PUBLICATIONS

"How to Capture and Stitch Panoramas"; http://www.picturecorrect.com/tips/how-to-capture-and-stitch-panoramas/>; Accessed Sep. 12, 2011; 4 pgs.
"Pan tilt zoom camera"; <http://en.wikipedia.org/wiki/Pan_tilt_zoom_camera>; Accessed Sep. 12, 2011; 2 pgs.
"Cisco WVC210 Wireless-G PTZ Internet Video Camera 2-way Audio"; <http://www.cisco.com/en/US/products/ps9948/index.html>; Accessed Sep. 12, 2011; 2 pgs.

* cited by examiner

IMAGE CONTROL METHOD FOR DEFINING IMAGES FOR WAYPOINTS ALONG A TRAJECTORY

TECHNOLOGICAL FIELD

Embodiments of the present invention relate to image control.

BACKGROUND

A camera sensor is capable of capturing an image as an array of pixels.

In some implementations, the process of controlling a camera sensor to capture one or more images may be automated. For example, focus may be automatic, exposure may be automatic and white balance may be automatic. Also, in a burst mode, a sequence of images may be taken automatically in rapid succession in response to a single user action.

BRIEF SUMMARY

According to various, but not necessarily all, embodiments of the invention there is provided a method comprising: displaying on a display a reference image; displaying on the display a start position within the reference image; displaying on the display an end position within the reference image; determining a trajectory between the start position and the end position; and defining a target image for each of a plurality of waypoints along the determined trajectory.

The method provides a new way to define a sequence of differently framed target images.

According to various, but not necessarily all, embodiments of the invention there is provided an apparatus comprising: a display; and a controller configured to:

control display on the display of a reference image;

control display on the display of a start position within the reference image;

control display on the display of an end position within the reference image;

determine a target image for each of a plurality of waypoints along a trajectory between the start position and the end position.

In some embodiments, the sequence of differently framed target images may be captured without movement of the camera sensor.

In some embodiments, all or some of the sequence of differently framed target images may be captured after determining the trajectory.

BRIEF DESCRIPTION

For a better understanding of various examples of embodiments of the present invention reference will now be made by way of example only to the accompanying drawings in which.

DETAILED DESCRIPTION

Figure 1:
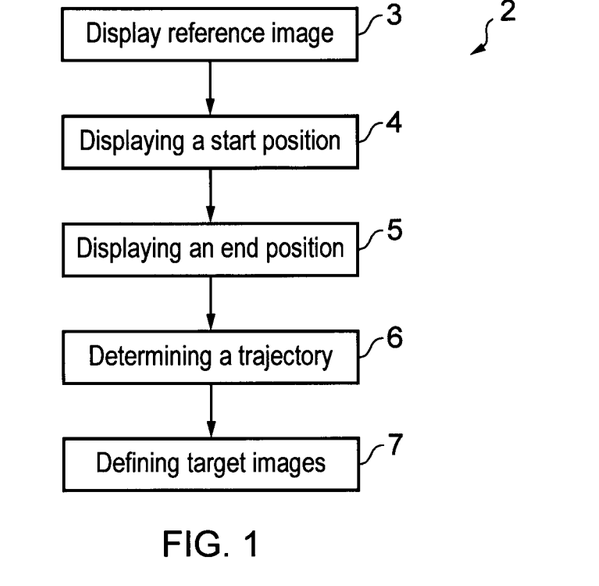
FIG. 1 illustrates an example of a method for defining a sequence of differently framed target images.

FIG. 1 schematically illustrates a method 2. The method defines a sequence of differently framed target images.

Figure 2A:
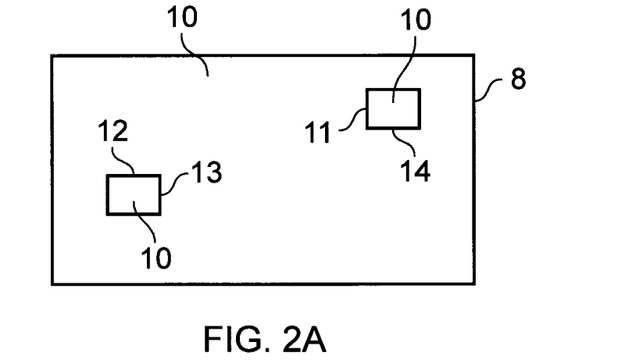
FIG. 2A illustrates an example of a start position and an end position within a reference image.

At block 3, a reference image is displayed on a display. FIG. 2A schematically illustrates a display 8 and a reference image 10 displayed on the display 8.

Next at block 4 of the method 2, a start position 12 is displayed, on the display 8, within the reference image 10.

At block 5 of the method 2, an end position 14 is displayed, on the display 8, within the reference image 10.

As illustrated in FIG. 2A the start position 12 and the end position 14 may be displayed simultaneously within the reference image 10.

In this illustrated example, the start position 12 is highlighted using a rectangular frame 13 that encloses or frames a portion of the reference image 10 and the end position 14 is highlighted using a different rectangular frame 11 that encloses or frames a different portion of the reference image 10.

Next at block 6 of the method 2, a trajectory 16 between the start position 12 and the end position 14 is determined.

Figure 2B:
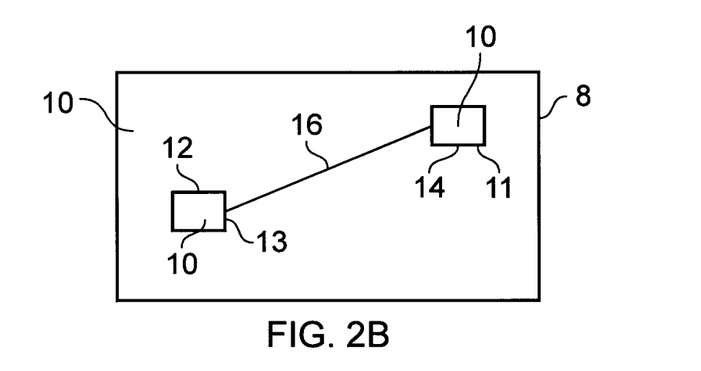
FIG. 2B illustrates an example of a trajectory between a start position and an end position within a reference image.

As illustrated in FIG. 2B an indication of the trajectory 16 may be displayed, on the display 8, within the reference image 10. In FIG. 2B, the trajectory 16 is displayed but in other embodiments waypoints 18 along the trajectory 16 may be displayed.

Next at block 7 of the method 2, a target image is determined for each of a plurality of waypoints along the determined trajectory 16.

Figure 3:
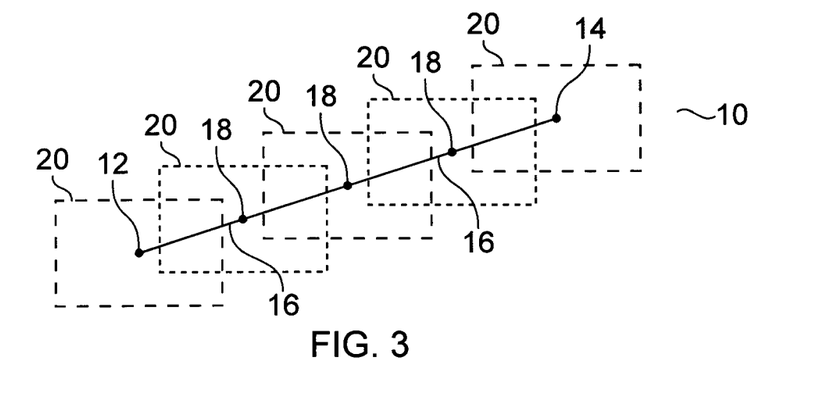
FIG. 3 illustrates an example of a sequence of differently framed target images associated with waypoints.

FIG. 3 schematically illustrates a sequence of target images 20. Each target image is associated with a different waypoint. Each target image is differently framed, that is the frames defining the perimeters of the target images 20 are displaced along the trajectory 16.

An initial target image 20 in the sequence is centered on the start position 12 (first waypoint). Referring back to FIG. 2A, the start position 12 may for example be determined by a center of the initial frame 13. The size of the initial frame 13 may also determine the size of the initial target image 20.

A final target image 20 in the sequence is centered on the end position 14 (end waypoint). Referring back to FIG. 2A, the end position 14 may for example be determined by a center of the final frame 11. The size of the final frame 11 may also determine the size of the final target image 20.

Each of the other intermediate target images 20 in the sequence is associated with a respective intermediate waypoint 18 on the trajectory 16. The trajectory 16 starts at the start point 12 and ends at the end point 14. In this example, the trajectory is divided into N segments of equal length. The end of the first N-1 segments is marked by a waypoint 18. Each target image 20 in the sequence is centered on a respective one of the waypoints 18, 12, 14.

Each target image 20 may be a different portion of a single image. Alternatively, each target image 20 may be a separately captured image. Alternatively, each target image may be a video frame from a video clip.

Figure 7:
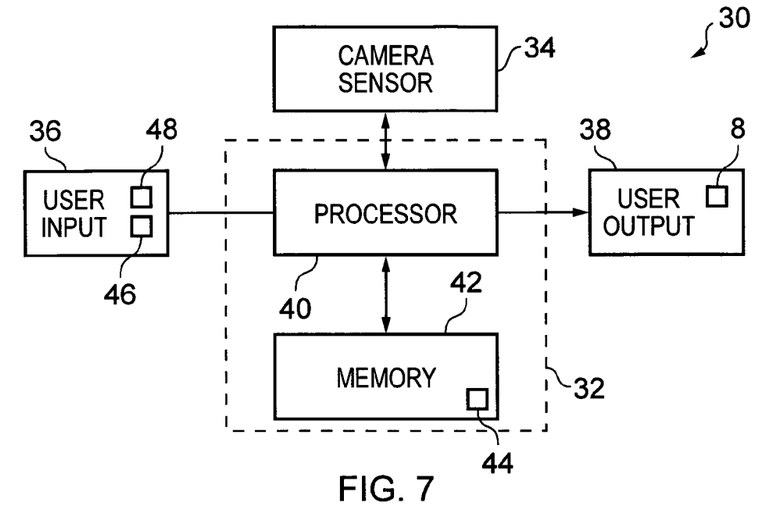
FIG. 7 illustrates an example of an apparatus 30 for defining a sequence of differently framed target images.

FIG. 7 schematically illustrates an example of an apparatus 30. The apparatus may be any suitable apparatus 30 with camera functionality. The apparatus 30 may be a hand-portable apparatus, that is, an apparatus sized to be carried in a palm of a human hand and/or to fit in an inside jacket pocket. Examples of suitable apparatus 30 include a portable camera, a mobile cellular telephone, a personal digital assistant, a personal computer, a tablet computer, a personal media player etc.

The apparatus 30 comprises a controller 32, a user input 36, a user output 38 and a camera sensor 34. The user output comprises a display 8.

The controller 32 is configured to receive user commands from the user input 36 and provide output commands to the user output 38. The controller 32 is also configured to control a camera sensor 34 and to receive images captured by the camera sensor 34.

In some embodiments, the camera sensor may comprise a large number of sensor elements each of which is capable of recording a color pixel. There may, for example, be in excess of 30 million sensor elements.

In some embodiments, the display 8 is a display that is used as a camera viewfinder. A camera viewfinder is used to display a representation of an image that would be captured by the camera sensor 34 if image capture occurred at that time.

In some embodiments, the user input 36 may comprise a touch sensitive screen 48 for touch input by a user. The touch sensitive screen 48 may be integrated with the display 8 as a touch sensitive display. In some embodiments, the touch sensitive display may be used as a camera viewfinder.

The controller 32 is configured to control the definition of target images 20, for example, as described in relation to the method 2.

For example, the controller 32 is configured to control display on the display 8 of a reference image 10; to control display on the display 8 of a start position 12 within the reference image 10; to control display on the display 8 of an end position 14 within the reference image 10; and to determine a target image 20 for each of a plurality of waypoints 18 along a trajectory 16 between the start position 12 and the end position 14.

In some but not necessarily all embodiments, the controller 32 may be configured to select portions of a single image as the target images. The controller 32 may have controlled the camera sensor 34 to capture the single image after determining the trajectory 16.

In some but not necessarily all embodiments, the controller may be configured to control the camera sensor 34 to capture each of the target images 20, after determining the trajectory 16. They may be captured with common camera settings of focus, exposure and white balance.

In some embodiments, the user input 36 may comprise a microphone 46 for recording ambient audio. The controller 32 may be configured to record audio using the microphone 46 for playback with playback of the sequence of target images 20.

In some embodiments, the controller 32 is configured to store in a memory a data structure defining an ordered sequence of the captured target images 20 along the determined trajectory 16. This data structure may be used for playback of the target images 20.

In some embodiments, the controller 32 is configured to store in a memory the defined target images, whereas in other embodiments it may be configured to store data in a memory defining which portions of a stored image or images are the target images 20.

In some embodiments, the method 2 is an image capture method. The controller 32 enables a user to control the image capture method 2 using the user input 36.

The user may be able to select a particular content for the initial target image 20 by changing the size of the initial frame 13 at the start position 12 and/or by changing the start position 12.

The user may be able to select a particular content for the final target image 20 by changing the size of the final frame 11 at the end position 14 and/or by changing the end position 14.

The user may be able to control how many waypoints 18/target images 20 are used either by selecting a number of target images 20/waypoints 18 or by selecting a playback time period for playback of the sequence of the target images 20.

The user may be able to control a format of the target images 20. For example, the target images 20 may be portions from a single image. Alternatively, the target images 20 may each be a whole or part of an image in a sequence of multiple different images. Alternatively, the target images may each be a whole or part of a frame in a video clip.

The display 8 may display the determined trajectory 16. The user input 36 may enable a user to control a shape of a displayed trajectory 16. For example, if the user input 36 comprises a touch sensitive display 8 then a user may be able to select the trajectory 16 by touching it using a digit and change its position by dragging the touching finger over the touch sensitive display 8. The trajectory 16 moves with the touching finger. However, the start point 12 and the end point 14 do not move.

Figure 4:
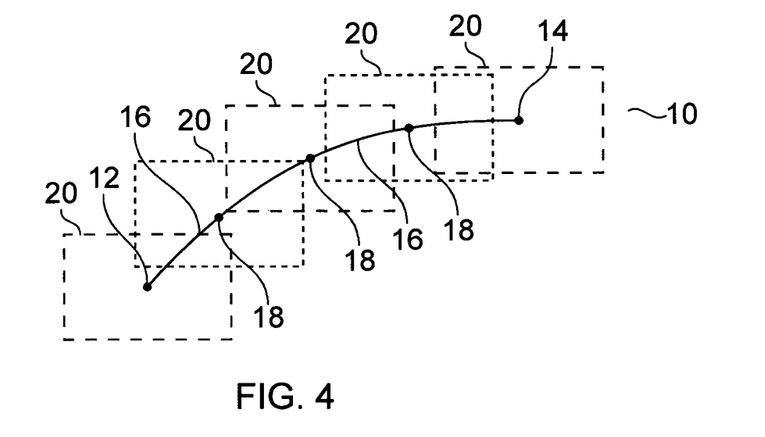
FIG. 4 illustrates an example of a displayed trajectory that has had its shape changed by a user.

FIG. 4 schematically illustrates a displayed trajectory that has had its shape changed by a user. The trajectory 16 is curved rather than straight.

The waypoints are illustrated on the curved trajectory 16 as is the sequence of target images 20 associated with the waypoints.

An initial target image 20 in the sequence is centered on the start position 12 (initial waypoint). Referring back to FIG. 2A, the start position 12 may for example be determined by a center of the initial frame 13. The size of the initial frame 13 may also determine the size of the initial target image 20.

A final target image 20 in the sequence is centered on the end position 14 (end waypoint). Referring back to FIG. 2A, the end position 14 may for example be determined by a center of the final frame 11. The size of the final frame 11 may also determine the size of the final target image 20.

Each of the other intermediate target images 20 in the sequence is associated with a respective intermediate waypoint 18 on the trajectory 16. The trajectory 16 starts at the start point 12 and ends at the end point 14. In this example, the trajectory is divided into N curved segments of equal length. The end of the first N−1 segments is marked by an intermediate waypoint 18. A target image 20 in the sequence is centered on a respective one of the waypoints 12, 14, 18.

Figure 5:
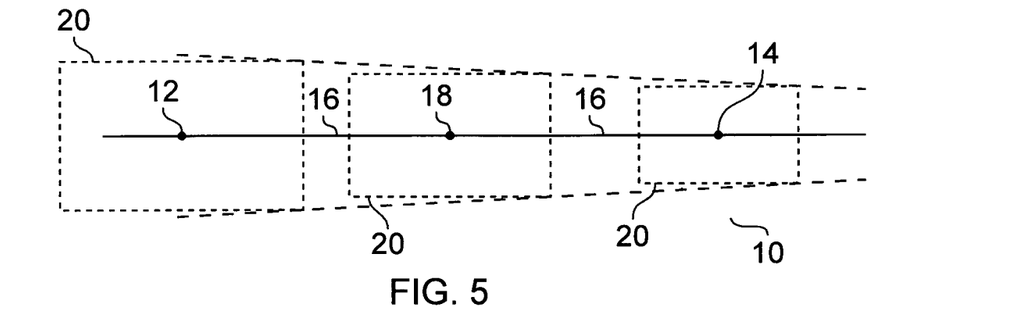
FIG. 5 illustrates an example of a sequence of differently framed target images of changing frame size.

Referring to FIG. 5, the controller 32 may be configured to determine a size (field of view) of a target image for each of the plurality of waypoints along the determined trajectory 16 between an initial target image 20 at the start position 12 and a final target image 20 at the end position 14.

The content of the initial target image 20 may be determined by the initial frame 13 at the start position 12. For example, the size (field of view) of the initial target image 20 may be determined by a size of the initial frame 13.

The content of the final target image 20 may be determined by the final frame 11 at the end position 14. For example, the size (field of view) of the final target image 20 may be determined by a size of the final frame 11.

As described above, each target image is associated with a waypoint along the determined trajectory between the initial target image 20 and final target image 20.

The size (field of view) of an intermediate target image 20 may be dependent upon the size (field of view) of the initial target image, the size (field of view) of the final target image and the distance of the waypoint associated with the intermediate target image 20 along the trajectory 16.

Let us assume a first aspect ratio R for each of the target images 20. Let the initial target image (frame 13) have a field of view defined by a length L1 and a height L1/R. Let the final target image (frame 11) have a field of view defined by a length L2 and a height L2/R. Let the length of the trajectory 16 between the initial target image 20 (start point 12) and the final target image 20 (end point 14) be Z. Let the position of an arbitrary target image (waypoint) along the trajectory 16 from the initial target image 20 and the final target image 20 be z.

Then the length LA of the field of view of the arbitrary target image 20 may be determined as:

$$LA = L1 + (L2 - L1) * z/Z$$

The width of the field of view of the arbitrary target image may be determined as:

LA/R

Thus the intermediate target images 20 associated with the waypoints along the determined trajectory 16 transition gradually in size (field of view) between the size (field of view) of the initial target image and the size (field of view) of the final target image. The transition is a linear transition that scales with the difference between the size (field of view) of the final target image and the initial target image and a distance z along the trajectory 16 from the initial target image of the waypoint associated with the target image.

Despite changing the field of view for the series of target images, it may be desirable to display the series of target images in a display constantly sized display region. Increasing the field of view, in this scenario, corresponds to a zoom-out. Decreasing the field of view, in this scenario, corresponds to a zoom-in.

Referring to FIGS. 3, 4 and 5, the target image 20 in the sequence of differently framed target images may be associated with a different portion of the camera sensor 34.

For example, if an array of sensor elements in the camera sensor maps to the pixels of the displayed reference image 10, then the differently framed target images 20 determined for the reference image 10 map to corresponding different portions of the sensor array.

The array of sensor elements in the camera sensor may include a very large number of sensor elements, for example, greater than 30 million sensor elements capable of capturing an equivalent number of color pixels. A single pixel in the reference image 10 may therefore map to an array of sensor elements. That is the ratio of sensed pixels to displayed pixels may be greater than 1. This enables a zoom function.

Changing a position of a target image 20 in the reference image 10 changes the location of that array of sensor elements.

Changing a size of a target image 20 in the reference image 10 changes the size of that array of sensor elements. Increasing the size of the array increases the field of view and also increases the number of sensed pixels (assuming that all sensor elements in the array are used).

Figure 9:
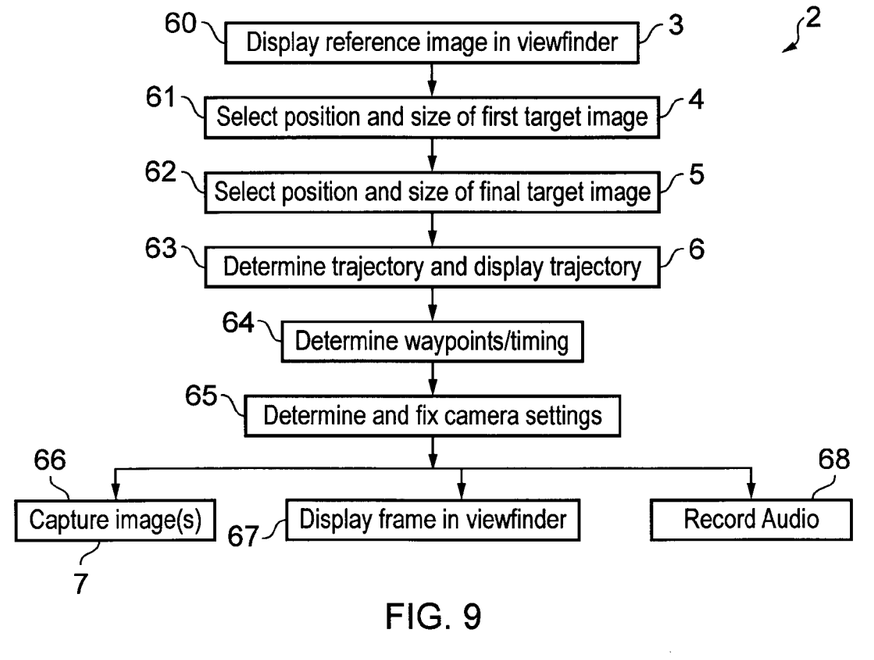
FIG. 9 schematically illustrates a method for capturing a sequence of differently framed target images without moving the camera sensor.

FIG. 9 schematically illustrates a method 2 that defines a sequence of differently framed target images 20. The method 2 is similar to that illustrated in FIG. 1 and where appropriate the references of FIG. 1 have been used in FIG. 9 to indicate similar blocks.

The method 2 illustrated in FIG. 9 relates to an embodiment whether putative target images are determined before one or more images are captured to define the actual target images 20. The images are captured using different portions of an array of sensor elements in the camera sensor 34.

The putative target images are determined by determining the trajectory 16 between the start position 12 and the end position 14, determining the waypoints 18 on the trajectory 16 and determining the size of the target images 20 associated with the waypoints 18.

At block 60, the reference image 10 is displayed in a touch-sensitive display 8 of a camera viewfinder.

At block 61, the user selects content of the initial target image by selecting a position and size of the initial frame 13 displayed over the reference image 10.

The position 12 of the initial frame 13 may be determined by touching a portion of the reference image 10 displayed in the touch-sensitive display 8. The initial frame 13 may be repositioned by placing a finger within the initial frame 13 and dragging the finger along the touch-sensitive display 8. The initial frame 13 may be re-sized by placing a finger at a corner of the initial frame 13 and dragging the finger along the touch-sensitive display 8. This re-sizes the initial frame 13 while maintaining its aspect ratio. The initial frame 13 may, in some embodiments, be re-sized by placing a finger at an edge of the initial frame 13 and dragging the finger along the touch-sensitive display 8. This re-sizes the initial frame 13 either lengthwise only or height-wise only depending on the selected edge.

At block 62, the user selects content of the final target image 20 by selecting a position and size of the final frame 11 displayed over the reference image 10.

The position of the final frame 11 may be determined by touching a portion of the reference image 10 displayed in the touch-sensitive display 8. The final frame 11 may be repositioned by placing a finger within the final frame 11 and dragging the finger along the touch-sensitive display 8. The final frame 11 may be re-sized by placing a finger at a corner of the final frame 11 and dragging the finger along the touch-sensitive display 8. This re-sizes the final frame 11 while maintaining its aspect ratio. The final frame 11 may, in some embodiments, be re-sized by placing a finger at an edge of the final frame 11 and dragging the finger along the touch-sensitive display 8. This re-sizes the final frame 11 either lengthwise only or height-wise only depending on the selected edge.

In some embodiments, if an aspect ratio of the final frame 11 is changed, the aspect ratio of the initial frame 13 is automatically changed to match and vice versa.

Next at block 63, a trajectory 16 between the initial frame 13 and the final frame 11 is determined. The initial frame 13 represents a putative initial target image. The final frame 11 represents a putative final target image.

The trajectory is displayed in the viewfinder 8. It may be modified by the user by, for example, dragging a portion of the trajectory 16 within the touch-sensitive display 8.

At block 64, the intermediate waypoints 18 along the trajectory are determined either manually, semi-automatically or fully automatically. The number of waypoints may be defined by a user either directly or indirectly or they may be calculated automatically. For example, a user may use the user input 36 to specify the number of waypoints used. Alternatively, the user may use the user input 36 to specify a playback time period which will be used to playback the sequence of target images 20. The controller 32 may be configured to calculate an appropriate number of waypoints given the playback time period.

The intermediate waypoints 18 determine the positions of the putative intermediate target images associated with the intermediate waypoints 18.

At block 64, the sizes (field of view) of the putative intermediate target images may also be determined, for example, as described with reference to FIG. 5.

At block 65, common camera settings of focus, exposure and white balance are determined.

The method 2 then performs blocks 66, 67, 68 in parallel, that is, simultaneously.

At block 66, in this embodiment, a sequence of target images 20 is captured that corresponds with the sequence of putative target images.

The sequence of target images is captured without having to move the apparatus 30 or camera sensor 34. Instead, different portions of the camera sensor are used for each target image 20. For example, if an array of sensor elements in the camera sensor maps to the pixels of the displayed reference image 10, then the putative target images determined for the reference image map to corresponding portions of the sensor array.

The array of sensor elements in the camera sensor 34 may include a very large number of sensor elements, for example, greater than 30 million sensor elements capable of capturing an equivalent number of color pixels. A single pixel in the reference image 10 may therefore map to an array of sensor elements.

At block 67, while the target images are being captured, each target image along the determined trajectory 16 in the reference image 10 is demarcated on the reference image 10 when the respective target image is being captured. For example, when a target image is captured a frame delineating that target image may be displayed in the reference image 10 in the viewfinder display 8.

At block 68, while the target images are being captured ambient audio is simultaneously recorded for playback with the sequence of target images. The audio may be recorded for a playback period.

In the method 2 illustrated in FIG. 9, each target image 20 is a separate automatically captured image.

In other embodiments, each target image 20 may be a portion of a single captured image.

In other embodiments, each target image may be a video frame of a captured video.

In the method 2 illustrated in FIG. 9, the trajectory 16 is determined before one or more images are captured to define the actual target images 20.

In other embodiments, the trajectory 16 may be determined after one or more images are captured to define the actual target images 20. For example the reference image may be a previously captured image. In this example, defining a target image for each of a plurality of waypoints along the determined trajectory 16 comprises processing the previously captured reference image.

Figure 6A:
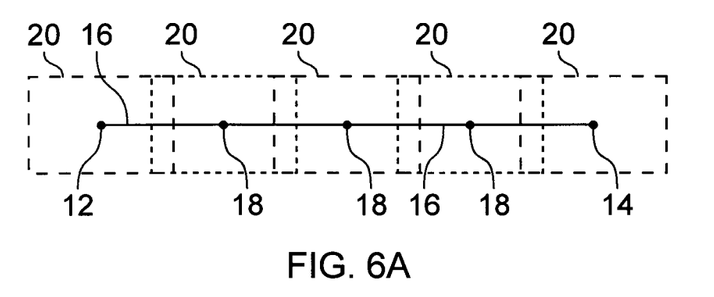
FIGS. 6A, 6B and 6C illustrate examples of playback of the sequence of differently framed target images.
Figure 6B:
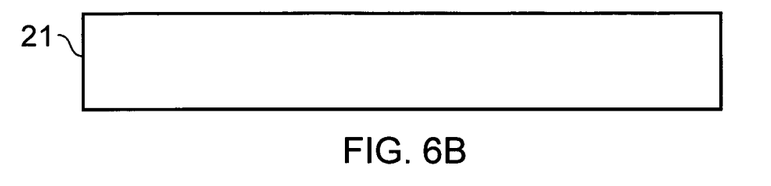
Figure 6C:
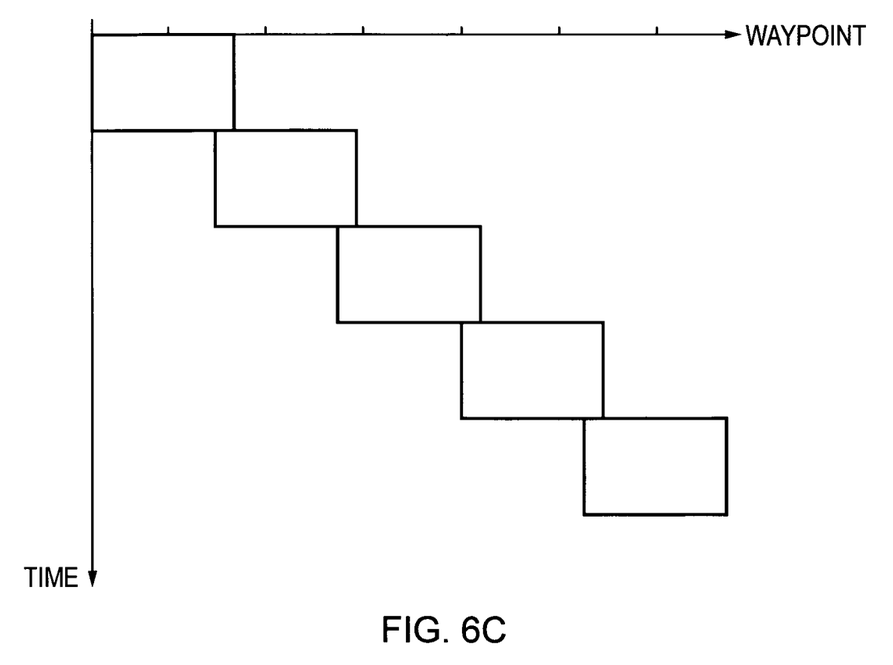

FIGS. 6A, 6B and 6C schematically illustrate playback of the sequence of target images 20.

FIG. 6A illustrates a situation where the trajectory 16 is a straight, horizontal line and the target images 20 are overlapping images of the same size evenly distributed along the trajectory 16.

FIG. 6B illustrates playback of the defined target images 20 illustrated in FIG. 6A as a panorama 21, that is, as a sequence over space. The target images 20 are displayed at the same time.

FIG. 6C illustrates playback of the defined target images 20 as a sequence of distinct images over time.

The FIG. 6C illustrates that the target images 20 in the sequence of target images are displayed one after the other, in order, as time passes.

The 'waypoint' x-axis is included to clearly distinguish the different target images 20 and that different ones of the targets images 20 are displayed at different times (y-axis). However, this x-axis displacement does not mean that the target images 20 are displayed at different locations in a display. The target images 20 may be displayed one after the other in the same display at a resolution that fills the particular display. The display for playback may or may not have a different resolution than the display 8 used for defining target image capture. Typically, each captured target image has more sensed pixels than the display 8 is capable of displaying. If the target images have been captured with different fields of view (differently sized arrays of sensor elements) then the target images may be displayed with different effective zooms to maintain a constant display resolution between the displayed target images. A zoom may therefore be applied across all of the target images based on the resolution of the playback display and a zoom may be applied between images to maintain a constant display resolution despite varying fields of view.

The playback of the target images may occur over a playback period. There may be playback of simultaneously recorded ambient audio during playback of the defined target images 20 as a sequence of distinct images over time.

The captured target images may have been recorded over a recording time. The playback time and the recording time may be the same or different. The number of captured target images recorded may depend upon the difference. For example, if slow-motion or fast-motion is required.

Referring back to FIG. 7, the controller 32 may be implemented using instructions that enable hardware functionality, for example, by using executable computer program instructions in a general-purpose or special-purpose processor that may be stored on a computer readable storage medium (disk, memory etc) to be executed by such a processor.

The controller 32 may comprise a processor 40 and a memory 42. The processor 40 is configured to read from and write to the memory 42. The processor 40 may also comprise an output interface via which data and/or commands are output by the processor 40 and an input interface via which data and/or commands are input to the processor 40.

The memory 42 stores a computer program 44 comprising computer program instructions that control the operation of the apparatus 30 when loaded into the processor 40. The computer program instructions 44 provide the logic and routines that enables the apparatus to perform the methods illustrated in the accompanying figures and the methods described in the accompanying text. The processor 40 by reading the memory 42 is able to load and execute the computer program 44.

The apparatus 30 therefore comprises: at least one processor; and at least one memory including computer program code the at least one memory and the computer program code configured to, with the at least one processor, cause the apparatus at least to perform: the method of any of claims 1 to 34.

Figure 8:
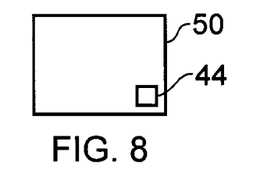
FIG. 8 illustrates an example of a record carrier tangibly embodying a computer program.

Referring to FIG. 8, the computer program may arrive at the apparatus 30 via any suitable delivery mechanism 50. The delivery mechanism 50 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 44. The delivery mechanism may be a signal configured to reliably transfer the computer program 44. The apparatus 30 may propagate or transmit the computer program 44 as a computer data signal.

Although the memory 42 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device."

As used here 'module' refers to a unit or apparatus that excludes certain parts/components that would be added by an end manufacturer or a user. The controller 32 may be a module. The controller 32 and camera sensor 34 may be housed in a single module.

The blocks illustrated in the FIGS. 1 and 9 may represent steps in a method and/or sections of code in the computer program 44. The illustration of a particular order to the blocks does not necessarily imply that there is a required or preferred order for the blocks and the order and arrangement of the block may be varied. Furthermore, it may be possible for some blocks to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method comprising:
   displaying on a display a reference image provided by a camera sensor;
   displaying on the display a start position within the reference image;
   displaying on the display an end position within the reference image;
   using a processor to determine a trajectory, within the reference image, between the start position within the reference image and the end position within the reference image and to define a target image for each of a plurality of waypoints along the determined trajectory;
   mapping each target image to a respective portion of the camera sensor; and
   capturing each target image with the respective portion of the camera sensor.

2. A method as claimed in claim 1, comprising: displaying the determined trajectory on the display.

3. A method as claimed in claim 1, comprising: enabling user control of a shape of the trajectory.

4. A method as claimed in claim 1, comprising: displaying the plurality of waypoints on the display.

5. A method as claimed in claim 1, comprising: enabling user control of how many waypoints are used.

6. A method as claimed in claim 1, comprising: enabling user selection of a format of the target images, wherein the format is selected from any one or more of: single image; sequential multiple images; video.

7. A method as claimed in claim 1, further comprising determining a target image size for each of the plurality of waypoints along the determined trajectory between an initial target image at the start position and a final target image at the end position, wherein the determined target image sizes for each of the plurality of waypoints along the determined trajectory between the initial target image and final target image is based upon a size of the initial target image and a size of the final target image.

8. A method as claimed in claim 1, wherein defining a target image for each of a plurality of waypoints along the determined trajectory comprises capturing one or more images after determining the trajectory between the start position and the end position wherein each target image is a portion of a single captured image or wherein each target image is a separate automatically captured image or wherein each target image is a frame of a captured video.

9. A method as claimed in claim 8, wherein the reference image is displayed in a touch-sensitive display of a camera viewfinder, wherein the start position within the reference image is user-definable by touching the touch-sensitive display and the end position within the reference image is user-definable by touching the touch-sensitive display.

10. An apparatus comprising:
at least one camera sensor;
at least one processor; and
at least one memory including computer program code the at least one memory and the computer program code configured to, with the at least one processor and the at least one camera sensor, cause the apparatus at least to perform the method of claim 1.

11. An apparatus comprising:
a camera sensor;
a display; and
a controller configured to:
control display on the display of a reference image provided by a sensor;
control display on the display of a start position within the reference image;
control display on the display of an end position within the reference image;
determine a target image for each of a plurality of waypoints along a trajectory, within the reference image, between the start position and the end position; and
map each target image to a respective portion of the camera sensor;
the camera sensor being configured to capture each target image with the respective portion of the camera sensor.

12. An apparatus as claimed in claim 11 further comprising a user input configured to enable one or more of:
user selection of the start position within the reference image;
user selection of the end position within the reference image;
user control of a shape of the trajectory when displayed on the display;
user control of how many waypoints are used;
user control of a time period for a playback sequence comprising the target images;
user selection of a format of the target images, wherein the format is selected from any one or more of: single image; sequential multiple images; video;
user control of an initial target image size at the start position;
user control of a final target image size at the end position.

13. An apparatus as claimed in claim 12 wherein the user input and display are combined as a touch sensitive display of a camera viewfinder.

14. An apparatus as claimed in claim 11, wherein the controller is configured to:
determine a target image size for each of the plurality of waypoints along the determined trajectory between an initial target image at the start position and a final target image at the end position, wherein the determined target image sizes for each of the plurality of waypoints along the determined trajectory between the initial target image and final target image is based upon a size of the initial target image and a size of the final target image, the determined target image sizes for each of the plurality of waypoints along the determined trajectory between the initial target image and final target image transitioning gradually in size, with a common aspect ratio, between the size of the initial target image and the size of the final target image.

15. An apparatus as claimed in claim 11 wherein the controller is configured to: determine a target image for each of a plurality of waypoints along the trajectory by selecting portions of the reference image as the target images.

16. An apparatus as claimed in claim 11 wherein the controller is configured to: determine a target image for each of a plurality of waypoints along the trajectory by controlling capture of a separate image for each target image.

17. An apparatus as claimed in claim 16, wherein the controller is configured to control capture of the separate images with common camera settings of focus, exposure and white balance.

18. An apparatus as claimed in claim 11, further comprising a microphone wherein the controller is configured to record audio using the microphone while the one or more captured images used to define the target images are being captured.

19. An apparatus as claimed in claim 11, wherein the controller is configured to playback the defined target images as a sequence of distinct images over time.

20. A method as claimed in claim 1, wherein each target image is a portion of the reference image.

* * * * *